United States Patent

[11] 3,585,610

[72] Inventors Peter G. Bartlett
Davenport, Iowa;
Joseph E. Meschi, Lyons, Ill.

[21] Appl. No. 748,583
[22] Filed July 10, 1968
[45] Patented June 15, 1971
[73] Assignee Gulf & Western Industries
New York, N.Y.
Continuation-in-part of application Ser. No. 682,814, Nov. 14, 1967.

[54] SOLID STATE MEMORY AND CODING SYSTEM
4 Claims, 4 Drawing Figs.

[52] U.S. Cl. .......... 340/173, 340/173.2
[51] Int. Cl. .......... G11c 11/22, G11c 13/00
[50] Field of Search .......... 340/173, 173.2, 174, 173 AM, 40, 41, 152; 235/92, 155

[56] References Cited

UNITED STATES PATENTS

| | | | |
|---|---|---|---|
| 3,015,091 | 12/1961 | Nyberg et al. | 340/174 |
| 3,231,361 | 1/1966 | Kilburn et al. | 340/174 |
| 3,351,921 | 11/1967 | Briggs | 340/174 |
| 3,388,387 | 6/1968 | Webb | 340/174 |
| 3,056,113 | 9/1962 | Smith | 340/173 |
| 3,058,659 | 10/1962 | Demmer et al. | 340/172.5 |
| 3,251,030 | 5/1966 | Bolton et al. | 340/168 X |
| 3,383,653 | 5/1968 | Bolton et al. | 340/41 X |

OTHER REFERENCES

" The Language & Symbology of Digital Computer Systems," RCA Service Co., Camden, N.J., 1959, pp. 102–105.

*Primary Examiner*—Terrell W. Fears
*Attorney*—Meyer, Tilberry and Body

ABSTRACT: A load sequence controller is provided which takes the form of a system of solid state memory elements, write circuits, interrogators and decoders to perform the function of a step switch which serves to allocate a plurality of loads selectively. The memory elements serve to receive and store an electrical signal representative of one of two binary states. The interrogator, which includes a logic decoder, serves to apply interrogating signals selectively to the memory elements, thereby providing a pattern of output signals representative of the binary state of the received signal for, in turn, energizing the selected loads. A circuit is provided for skipping the interrogating function of at least a selected one of the memories. The skipping circuit is interposed between the decoder output circuit and the memories for receiving the interrogation signals and has an output circuit for routing the interrogation signal on a selected one of the decoder output circuits as an input trigger signal to a counter to change the pattern of count signals quickly for skipping the interrogating function of the memory associated with the selected decoder output circuit.

PATENTED JUN 15 1971 3,585,610

SHEET 1 OF 3

INVENTORS.
PETER G. BARTLETT &
JOSEPH E. MESCHI
BY
*Meyer, Tilberry & Body*
ATTORNEYS

INVENTORS.
PETER G. BARTLETT &
JOSEPH E. MESCHI
BY

ATTORNEYS

INVENTORS.
PETER G. BARTLETT &
JOSEPH E. MESCHI
BY
Meyer, Tilberry & Body
ATTORNEYS

SOLID STATE MEMORY AND CODING SYSTEM

The present invention is a continuation-in-part of our U.S. Pat. application Ser. No. 682,814, filed Nov. 14, 1967 entitled "Load Sequencer Controller," assigned to the same assignee as the present invention.

This invention relates to the art of electrical controls and, more particularly, to electrical controls for selectively allocating a plurality of loads.

The invention is particularly applicable to the art of solid state step switches and will be described with particular reference thereto; although, it is to be appreciated that the invention has broader applications, such as in process controls or other control arts, wherein means are required to selectively allocate a plurality of loads.

In the past, load intervals have been selectively allocated with the use of an electromechanical step switch mechanism, using breakaway cams to control the load sequencing program. Such electromechanical mechanisms are inherently slow in operation, and any program change requires the breaking away of a new set of cams. The reliability and flexibility of such an electromechanical mechanism is limited, due to the use of mechanical moving parts.

In more recent years, electronic controllers have included ring counters and ring timer circuits for selectively allocating various loads in an cyclical fashion. Such circuits, however, are not readily adjustable to provide for load program changes and generally require substantial rewiring to effectuate such a change in the program.

The present invention is directed toward a solid state step switch which selectively allocates a plurality of load intervals without the use of electromechanical mechanisms and the like, and wherein readily adjustment may be made in the load interval program.

In accordance with the present invention, the solid state step switch includes a plurality of memories, each including at least one memory means that exhibits the characteristic of serving to receive and store an electrical signal representative of one of two binary states, and upon application thereto of an electrical interrogation signal provides an output signal representative of the binary state of the received electrical signal. In addition, each memory means has an input for receiving an interrogation signal and an output for carrying an output signal. An actuator means, such as a mechanical switch, serves upon each actuation to provide a trigger pulse. A counter serves to count the trigger pulses and carries a pattern of count signals on its output circuits, wherein the pattern changes in accordance with the number of counted trigger pulses. A decoder having a plurality of output circuits, one associated with each memory and coupled to the input circuit of each memory means in the associated memory, is coupled to the counter for decoding the pattern of count signals and placing an interrogation signal on a particular one of the decoder output circuits in accordance with the number of counted trigger pulses so that an associated memory is interrogated. An output load control circuit serves to couple the output circuit of each memory means with an associated load.

In accordance with a more limited aspect of the present invention, a memory interval skipping device is provided for skipping the interrogating function of selected ones of the memories. This skipping device includes selectively actuatable switching means coupling each of the decoder output circuits with the input circuit of the counter. In this manner, when a particular decoder output circuit carries an interrogation signal, this signal is immediately routed to the counter as an additional trigger pulse to be counted so that the anticipated interrogating function of a particular memory is skipped.

In accordance with a still further aspect of the present invention, an end skip device is provided for resetting the binary counter to again begin counting trigger pulses when a selected one of the decoder output circuits has been energized to carry an interrogation signal.

The primary object of the present invention is to provide an improved solid state step switch controller which is relatively inexpensive to manufacture and relatively economical to operate.

Another object of the present invention is to provide a selective load controller having a plurality of memory means which are interrogatable to selectively allocate a plurality of loads.

Another object of the present invention is to provide a solid state step switch having interval load program storage memories which incorporate ferroelectric storage capacitors.

A still further object of the invention is to provide an improved solid state step switch for selectively allocating a plurality of loads having a memory means which is independently permanent.

These and other objects and advantages of the invention will become apparent from the following description of the preferred embodiments of the invention as read in connection with the accompanying drawings, in which.

Figures 1, 2:
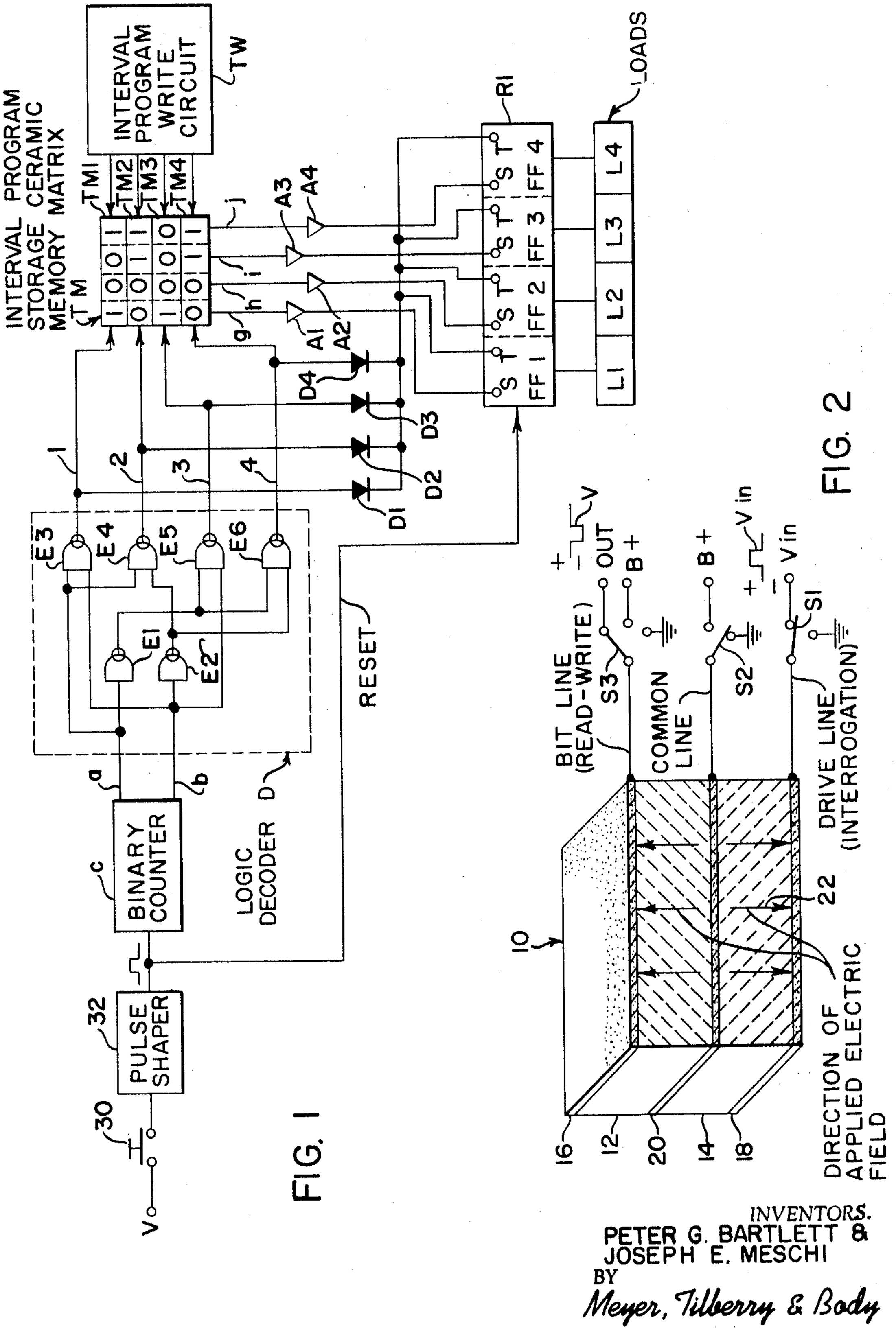
FIG. 1 is a combination schematic-block diagram illustrating one embodiment of the invention.
FIG. 2 is a schematic illustration of a ceramic memory single bit device.

Referring now to the drawings, wherein the showings are for the purpose of illustrating the preferred embodiments of the invention, and not for purposes of limiting the same, FIG. 1 illustrates one embodiment of the invention in the form of a selective load controller or solid state step switch. This controller serves to selectively allocate the desired pattern of loads. The basic configuration of the controller includes a jog switch 30; a pulse shaper 32; a binary counter C; a logic decoder D; a program storage memory matrix TM, having four word line memories TM1, TM2, TM3 and TM4; a program write circuit TW; and, a load control circuit including register R1 for coupling the controller to various loads.

CERAMIC MEMORY DEVICE

The ceramic memory matrix TM preferably takes the form as illustrated in U.S. Pat. No. 3,401,377, which issued Sept. 10, 1968, on our copending application, Ser. No. 640,717, filed May 23, 1967, and assigned to the same assignee as the present invention, and which application is herein incorporated by reference. The ceramic memory matrix disclosed there incorporates several word lines each having several bits. An understanding of the matrix may be best understood by first considering the construction of a single bit ceramic memory device. A single bit ceramic memory device 10 is shown in FIG. 2, and generally comprises a memory plate 12 constructed of ferroelectric material, such as barium titanate, Rochelle salt, lead metaniobate or lead titanate zirconate composition, for example. In its preferred form, however, memory plate 12 is constructed of lead titanate zirconate composition since it is easy to polarize. Drive plate 14 is preferably constructed of ferroelectric material having piezoelectric characteristics, such as lead titanate zirconate composition. However, the drive plate may be constructed of any material that will change its dimensions upon application of an electrical signal, such as, for example, magnetostrictive material, which upon application of current thereto will undergo physical dimension changes. Drive plate 14 is permanently polarized and need not be constructed of easily polarizable material, such as lead titanate zirconate composition.

Plates 12 and 14 are, in their unstressed condition, approximately flat, and are oriented so as to be in substantial superimposed parallel relationship. The upper surface of plate 12 is coated with an electrically conductive layer 16, and the lower surface of plate 14 is coated with an electrically conductive layer 18. Layers 16 and 18 may be of any suitable electrically conductive material, such as silver. Interposed between facing surfaces of plates 12 and 14 there is provided a third layer 20 of electrically conductive material. Layer 20 may be constructed of a conductive epoxy, such as epoxy silver solder, so that facing surfaces of plates 12 and 14 are electrically connected together as well as mechanically secured together. In this manner, as will be described below, when drive plate 14 is stressed it, in turn, transmits mechanical forces to plate 12, so as to mechanically stress plate 12 in directions acting both laterally and perpendicularly of its plane.

Drive plate 14 may be permanently polarized by applying an electric field across its opposing flat surfaces. Thus, as shown in FIG. 2, layer 18 is electrically connected to a single pole, double throw switch S1 which serves to connect layer 18 with either an electrical reference, such as ground, or to an interrogating readout voltage source $V_{in}$. Similarly, layer 20 is connected with the single pole, double throw switch S2. Switch S2 serves to connect layer 20 with either an electrical reference, such as ground, or to a source of polarizing voltage B+. Plate 14 may now be polarized by connecting layer 20 with the B+ voltage supply source and layer 18 to ground potential. Thus, an electrical field of sufficient magnitude to polarize plate 14 is applied across the opposing faces of the plate. The direction of the electric field is indicated by arrows 22. Thereafter, switches S1 and S2 may be returned to positions as shown in FIG. 2 for a subsequent readout operation.

Binary information may be stored in memory plate 12 by applying an electric field between the opposing faces of the plate in either one of two directions, so that the plate stores either a binary "1" or a binary "0" signal. Layer 16 is connected to a single pole switch S3. Switch S3 serves to connect layer 16 with either a ground potential or a B+ source of polarizing potential, or to an output circuit OUT. When it is desired to store a binary "1" signal in memory plate 12, switches S2 and S3 are manipulated so that B+ potential is applied to layer 16 and ground potential is applied to layer 20. As shown in FIG. 2, however, plate 12 stores a binary "0" signal, which results from having applied B+ potential to layer 20 and ground potential to layer 16.

With switches S1, S2 and S3 in the positions as shown in FIG. 2, an interrogating input voltage $V_{in}$ is applied to layer 18. If the applied voltage $V_{in}$ is of a polarity opposite to the direction of polarization of the drive plate, then the magnitude of this interrogation voltage is kept well below the polarization voltage threshold, i.e., the voltage required to permanently polarize drive plate 14, so that the readout process is nondestructive. Application of the readout voltage pulse causes the drive plate to contract or expand in the direction dependent on its prepolarization, as well as the polarity of the applied readout voltage pulse. The direction of contraction or expansion will be both laterally and perpendicularly of the plane defined by plate 14. Since plates 12 and 14 are bonded together, as by the layer 20 of conductive epoxy, any change in physical dimensions of plate 14 will cause corresponding changes in physical dimensions of plate 12. When the memory plate is thus stressed, it develops a voltage which appears between layers 16 and 20, with the polarity at layer 20 being positive or negative, dependent on the state of prepolarization of the memory plate, as well as the direction of mechanical stress. Thus, with reference to FIG. 2, the output voltage $V_0$ will be a negative pulse representative that a binary "0" signal is stored by plate 12. For a further description of a ceramic memory device as shown in FIG. 2, reference should be made to U.S. Pat. application, Ser. No. 640,717.

CERAMIC MEMORY MATRIX

Figure 3:
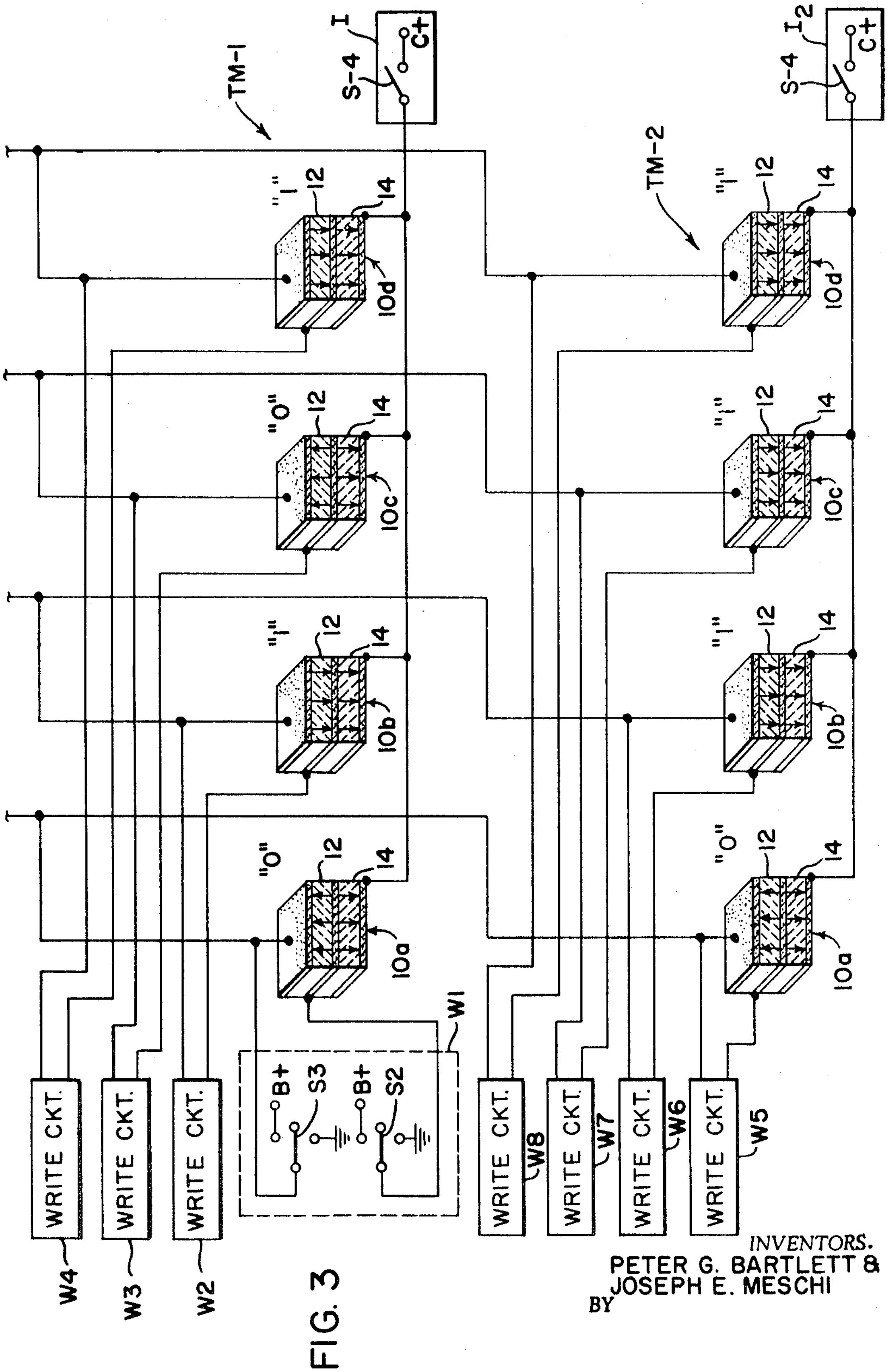
FIG. 3 is a schematic illustration of a ceramic memory matrix.

Having now described a single bit ceramic memory device, together with the manner in which binary information is stored and interrogated, reference is now made to the ceramic memory matrix of FIG. 3. This matrix includes two word line memories TM1 and TM2 which, for example, may correspond with the word line memories TM1 and TM2 of the ceramic memory matrix TM of FIG. 1. As shown in FIG. 3, each word line memory TM1 and TM2 includes four single bit ceramic memory devices 10*a*, 10*b*, 10*c*, and 10*d*, each corresponding with the single bit ceramic memory device 10 illustrated in FIG. 2. The common lines of memory devices 10*a*, 10*b*, 10*c* and 10*d* in word line memory TM1 are connected to write circuits W1, W2, W3 and W4, respectively. Similarly, the bit lines of ceramic memory devices 10*a*, 10*b*, 10*c* and 10*d* of word line memory TM1 are also connected to write circuits W1, W2, W3 and W4. Also, in a similar manner, the common lines and bit lines of ceramic memory devices 10*a*, 10*b*, 10*c* and 10*d* of word line memory TM2 are connected to write circuits W5, W6, W7 and W8.

Each write circuit may be identical and take the form as write circuit W1, shown in detail in FIG. 3. The write circuit W1 corresponds with the circuitry shown in FIG. 2 and includes switch S2 and switch S3. Switch S2 serves to selectively connect the common line of ceramic memory device 10*a* with either ground potential or B+ potential or open circuit, and switch S3 serves to respectively connect the bit line of memory device 10*a* with either ground potential or B+ potential or open circuit. The drive lines of ceramic memory devices 10*a*, 10*b* and 10*d* in word line memory TM1 are connected together in common and, thence, through a normally open switch S4 to a C+ voltage supply source in a sequence interrogator circuit $I_1$. Similarly, the drive line conductors of ceramic memory devices 10*a*, 10*b*, 10*c* and 10*d* in word line memory TM2 are connected together in common and thence through a switch S4 to a C+ voltage supply source in an interrogator circuit $I_2$.

In operation, switches S2, S3 in each of the write circuits W1 through W8 may be manipulated to prepolarize the memory plate in word line memories TM1 and TM2. This writing function is the same for each memory device as previously described with reference to FIG. 2. As shown by the direction of the arrows on the memory plates 12 in word line memory TM1, the pattern of binary signals stored by the four memory devices is 0–1–0–1. Similarly, as shown by the arrows on the memory plates 12 in word line memory TM2, the patten of binary signals stored is 0–1—1. Thus, the decimal number of the weighted binary content of word line memory TM1 is 5 and the decimal number of the weighted binary content of word line memory TM2 is 7.

Upon closure of switch S4 in the interrogation circuit $I_1$ the pattern of the binary signals on the bit lines taken from the four ceramic memory devices of word line memory TM1 will be 0–1–0–1. Similarly, when switch S4 in interrogator circuit $I_2$ is closed, the pattern of the binary signals on the bit lines of the ceramic memory devices of word line memory TM2 will be 0–1–1–1. As previously discussed with reference to FIG. 2, the duration of the output voltage $V_0$ on each bit line corresponds in time with the duration of the interrogating voltage $V_{in}$. Accordingly, the pattern of open circuit binary signals obtained on the bit lines of word line memory TM1 or word line memory TM2 exhibits a time duration in accordance with the time duration of application of the interrogating voltage, i.e., the time duration that switch S4 in interrogating circuit $I_1$ is closed, or that switch S4 in interrogating circuit $I_2$ is closed.

FIRST EMBODIMENT

Having now described a ceramic memory matrix, circuitry for alternating the binary information stored, and circuitry for interrogating the matrix, a description is now presented as to the manner in which the matrix is interconnected with various circuits to provide a solid state step switch. As shown in FIG. 1, the step switch includes a voltage source V which preferably takes the form of a direct current voltage source. Source V is coupled to a pulse shaper 32 by means of a normally open jog switch 30. The pulse shaper 32 may take any suitable form such as, for example, a monostable multivibrator circuit which serves, for each actuation of switch 30, to pro-vide at its output circuit a positive going trigger pulse. The output circuit of the pulse shaper 32 is coupled to a two stage binary counter circuit C having two output circuits *a* and *b*, which carry a pattern of binary signals which varies in accordance with the decimal weight of the number of counted pulses.

The operation of binary counter C is best illustrated by TRUTH TABLE I, below.

TRUTH TABLE I

| Binary signals on circuits | | Number of trigger pulses counted |
|---|---|---|
| *b* | *a* | |
| 0 | 0 | 0 |
| 0 | 1 | 1 |
| 1 | 0 | 2 |
| 1 | 1 | 3 |

From the above table, it will be noted that when no trigger pulses have been counted, the binary weight of circuits *b* and *a* is 0–0. Similarly, when one pulse has been counted, the binary weight is 0–1; when two pulses have been counted, the binary weight is 1–0; and when three pulses have been counted, the binary weight is 1–1.

The output circuits *a* and *b* of binary counter C are respectively coupled to the input circuits of NOR gates E1 and E2 in the logic decoder circuit D. Decoder circuit D also includes NOR gates E3, E4, E5 and E6 having output circuits 1, 2, 3 and 4, respectively. Each of these NOR gates may take the form, for example, of the RLT resistor-transistor logic circuit illustrated in FIG. 7.5 on page 178 of General Electric Transistor Manual, Seventh Edition. As shown in FIG. 1, output circuit a of counter C, in addition to being coupled to the input circuit of NOR Gate E1, is also coupled directly to the input circuits of NOR circuits E3 and E4. Similarly, the output circuit *b* of binary counter C, in addition to being coupled to the input circuit of NOR circuit E2, is also directly coupled to the input circuits of NOR circuits E3 and E5. The output circuit of NOR circuit E1 is directly coupled to the input circuits of NOR circuits E5 and E6. Similarly, the output circuit of NOR circuit E2 is directly coupled to the input circuits of NOR circuits E4 and E6.

The output circuits 1, 2, 3 and 4 of NOR circuits E3, E4, E5 and E6, respectively, also serve as the output circuits of logic decoder circuit D. Output circuits 1 through 4 carry either a binary "0" signal or a binary "1" signal, i.e., a negative (or ground) potential, or a positive potential, in accordance with the number of trigger pulses counted. The operation of the decoder circuit D is best explained by reference to TRUTH TABLE II, below.

TRUTH TABLE II

| Binary signals on circuits | | | | Number of trigger pulses counted |
|---|---|---|---|---|
| 1 | 2 | 3 | 4 | |
| 1 | 0 | 0 | 0 | 0 |
| 0 | 1 | 0 | 0 | 1 |
| 0 | 0 | 1 | 0 | 2 |
| 0 | 0 | 0 | 1 | 3 |

With reference to TRUTH TABLE II, it will be noted that when no trigger pulses have been counted only output circuit 1 carries a binary "1" signal. Similarly, when one pulse has been counted only output circuit 2 carries a binary "1" signal, and when two pulses have been counted only output circuit 3 carries a binary "1" signal, and when three pulses have been counted only output circuit 4 carries a binary "1" signal. The binary "1" signals on output circuits 1, 2, 3 and 4 are used as interrogating signals for the associated word line memories TM1, TM2, TM3 and TM4, respectively, of the ceramic memory matrix TM.

The ceramic memory matrix TM includes four word line memories TM1, TM2, TM3 and TM4 each of which can be constructed as schematically illustrated in FIG. 3 with respect to word line memories TM1 and TM2. Preferably, however, this matrix is constructed in accordance with the improved matrix disclosed in our previously identified Pat. application, Ser. No. 640,717. As shown in FIG. 3, each of the four word line memories includes four ferroelectric bistable memory means which serve to receive and store a binary "1" or a binary "0" signal. Each of the memory means 10*a*, 10*b*, 10*c* and 10*d* in FIG. 3 has an input in the form of a drive line which are all connected together in common for any one word line memory, and thence to one of the outputs 1, 2, 3 or 4 of the logic decoder D for receiving interrogation signals. Also, each of these bistable memory means has an output in the form of a bit line which serves to carry a binary signal in response to receipt of an interrogation signal. These bit lines for associated bits of the various word line memories may be connected together, as shown in FIG. 3. The bit line output circuits of the matrix TM includes circuits *g*, *h*, *i*, and *j* which are respectively coupled through bit line amplifiers A1, A2, A3 and A4 to a flip-flop register R1.

Register R1 includes four type D flip-flops FF1, FF2, FF3 and FF4, each having a set terminal S and a toggle terminal T. The outputs of amplifier A1 through A4 are respectively connected to set terminals S of flip-flops FF1 through FF4. The output circuits of these four flip-flops are connected respectively to loads L1 through L4. The outputs 1, 2, 3 and 4 of the logic decoder D are respectively connected through diodes D1 through D4 to the toggle terminals T of each flip-flop of the register R1.

Interval program write circuit TW has four outputs respectively coupled to word line memories TM1, TM2, TM3 and TM4 for electrically altering the binary state of each memory means in the associated word line memories. This circuitry may take the form as shown by the simplified circuit W1 in FIG. 3 or, alternately, may take the form of more complex solid state static element automatic writing circuitry.

OPERATION

The four word line memories of memory matrix TM serve to store binary signals representative of the desired load program for the various load programs to be allocated. In the example of FIG. 1, only four load programs are allocated and are represented by the pattern of binary signals stored in word line memories TM1, TM2, TM3 and TM4, respectively. The pattern of binary signals to be stored in these word line memories should be written as desired. Thus, for example, in order to program the first step or interval to allow energization of loads L1 and L4, the circuitry in the program write circuit TW is manipulated so that the pattern of binary signals stored in word line memory TM1 is 1–0–0–1. With this pattern of binary signals stored in the memory, the interrogation of word line TM1 will cause the loads L1 and L4 to be energized. This pattern of binary signals is indicated on word line memory TM1 of FIG. 1. Similarly, if it is desired to energize loads L3, L4 as the second step or interval in the program, the program write circuit TW is manipulated so that the memory means in word line TM2 stores the binary signal pattern 0–0–1–1. This is shown on word line TM2 in FIG. 1.

With the matrix TM having its memories written as discussed above, the operation of selectively allocating the loads L1 through L4 will now be presented. Upon each closing of the normally open jog switch 30, a positive going trigger pulse is produced at the output of the pulse shaper 32. Upon receipt of each trigger pulse, the two stage binary counter C produces a pattern of output signals at terminals *a*, *b* which is representative of the "count" of the number of times jog switch 30 has been closed. This pattern changes as indicated in TRUTH TABLE I. This pattern of signals is received by the logic decoder D which, in turn, energizes a selected one of output units 1, 2, 3 or 4, in accordance with TRUTH TABLE II. For example, upon application of power to the circuitry, and prior to the first closure of switch 30, output circuit 1 carries a binary "1" signal. This is a positive voltage signal, as represented by voltage $V_{in}$ in FIG. 2, and serves to interrogate word line memory TM1. Upon interrogating word line memory TM1, a pattern of binary signals (1-0-0-1) is provided on output circuits *g*, *h*, *i* and *j*. This pattern of binary signals is in accordance with the state of prepolarization of each memory plate 12 in the several memory means being interrogated. The signals on output circuits *g*, *h*, *i* and *j* are amplified through the amplifiers A1 through A4 and provide inputs for the register R1. The register R1, being comprised of a four stage flip-flop circuit, provides an output pattern corresponding to the input signals and thereby energizes the respective loads L1 through L4. In this example, loads L1 and L4 will be energized.

SECOND EMBODIMENT

Figure 4:
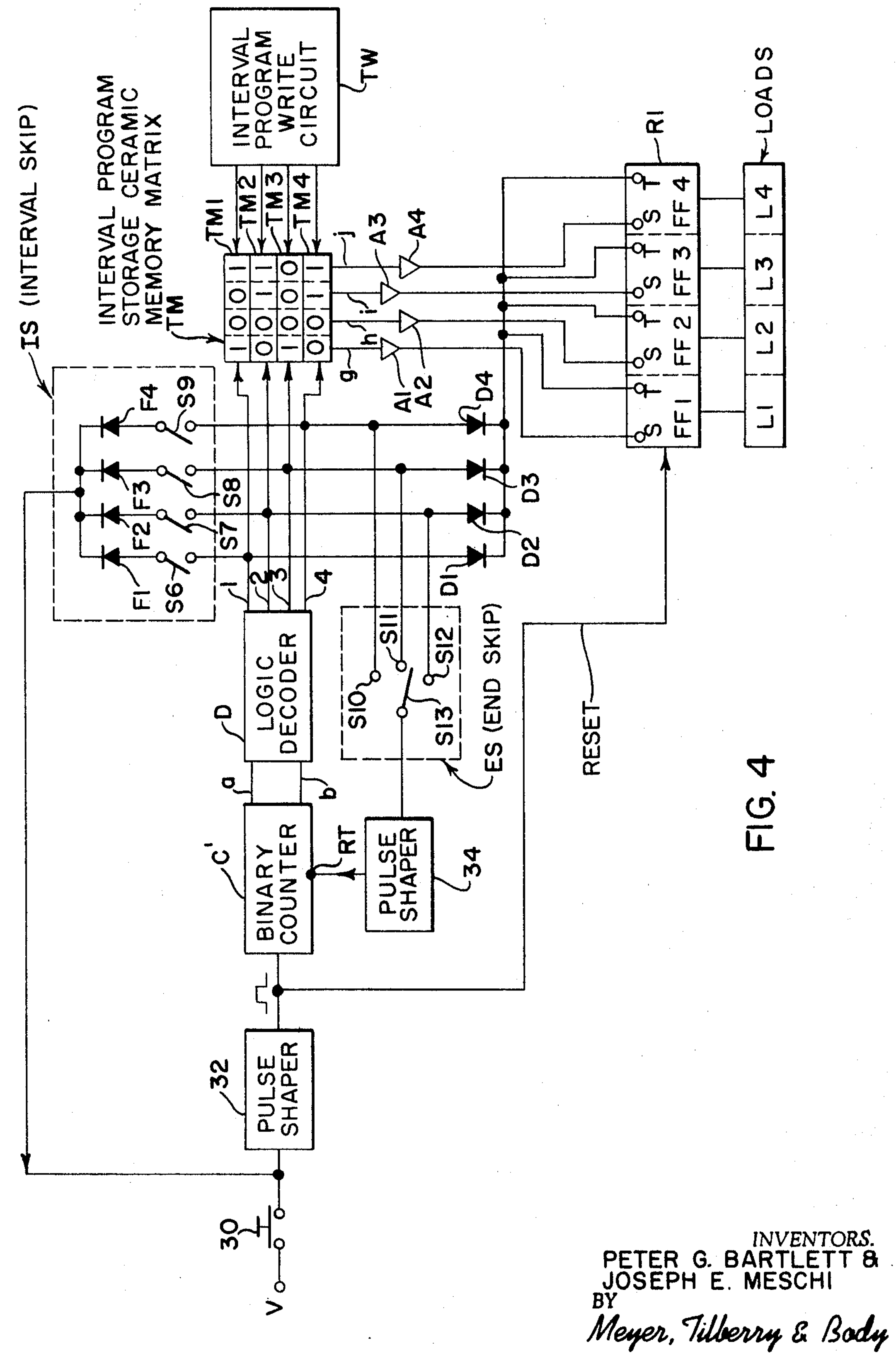
FIG. 4 is a combined schematic-block diagram illustrating a second embodiment of the invention.

Referring now to FIG. 4, there is shown a second embodiment of the invention. This embodiment is quite similar to that as shown in FIG. 1, and, accordingly, like components in both FIGS. are identified with like character references. Before discussing the additional circuitry, a few comments are in order with respect to modifications made to circuitry found in FIG. 4, which compares with corresponding circuitry in FIG. 1. Thus, binary counter C' in FIG. 4 includes a reset terminal RT for receiving a positive reset signal for resetting the counter to zero.

In the embodiment of FIG. 4, an interval skip circuit IS and an end skip circuit ES are interposed between the logic decoder D and the memory matrix TM. Output circuits 1, 2, 3 and 4 of the logic decoder D are respectively connected through manually operable, normally open, interval skip switches S6 through S9 and their respectively series connected diodes F1 through F4 to the output of jog switch 30. Also, the output circuits 1, 2, 3 and 4 of the logic decoder D are respectively connected to end skip switch terminals S10 through S12, respectively. A movable switch arm S13 serves to connect a selected one of terminals S10 through S12 through a pulse shaper circuit 34, which may take the form of a monostable multivibrator, to the reset terminal RT of counter C'.

The operation of the embodiment illustrated in FIG. 4, with the exception of the interval skip circuit IS and the end skip circuit ES is essentially the same as that discussed hereinbefore with respect to the embodiment of FIG. 1. It may be desirable to skip a single interval or step of the program, as by skipping an interrogating function of one of the word line memories TM1 through TM4. Further, it may be desirable to skip from a particular interval or step in the program to the starting point in the program. The interval skip circuit IS, and the end skip circuit ES are incorporated into the circuit to respectively provide these functions.

If, for example, it is desired to omit interval 1 (interrogation of word line memory TM1) in the program, the interval skip switch S6 is closed, thereby transmitting the signal on circuit 1 of the logic decoder directly to the input of pulse shaper 32. This signal provides an input to the pulse shaper 32 similar to that produced when the jog switch 30 is closed, thereby driving the binary counter C' into the second "count". In a similar manner, any of the program intervals can be skipped by closing the proper interval skip switch S6 through S9.

The end skip switch terminals S10 through S12 and switch arm S13 are employed to provide a skip from any selected interval directly to the beginning interval of the program. For example, if arm S13 is manipulated to engage terminal S10, then whenever there is an output signal, i.e., a binary "1" signal, on circuit 4 of the logic decoder D, the signal will be coupled to the input of the pulse shaper 34. Upon receipt of this signal, pulse shaper 34 provides an output signal to reset terminal RT to reset counter C'. When the binary counter C' is reset, the counter output has a pattern of signals representative of a zero count of the jog switch 30, thereby skipping the fourth interval and returning to the first interval of the program. In a like manner, the program can be arranged so as to skip from the second or third intervals directly to the beginning of the program by manipulating switch arm S13 to engage either switch terminal S11 or S12.

Although the invention has been shown in connection with preferred embodiments, it will be readily apparent to those skilled in the art that various changes in form and arrangements of parts may be made to suit requirements without departing from the spirit and scope of the invention as defined by the appended claims.

We claim:

1. A solid state step switch comprising:

a plurality of memories, each said memory including at least one memory means exhibiting the characteristic of serving to receive and store an electrical signal representative of one of two binary states and upon application thereto of an electrical interrogation signal provides an output signal representative of the binary state of a received said electrical signal, each said memory means having an input for receiving an interrogation signal and an output for carrying a said output signal;

actuator means for, upon each actuation, providing a trigger pulse;

means for counting said trigger pulses and having a plurality of output circuits carrying a pattern of count signals which changes in accordance with the number of counted trigger pulses;

decoder means having a plurality of output circuits, one associated with each said memory and coupled to the input circuit of each said memory means in the associated memory, said decoding means being coupled to said counting means for decoding said pattern of count signals and placing an interrogation signal on a particular one of the decoder output circuits in accordance with the number of counted trigger pulses so that an associated memory is interrogated;

output load control circuit means for coupling the output circuit of each said memory means with an associated load; and memory interval skip means for skipping the interrogating function of at least a selected one of said memories, said skip means being interposed between said decoder output circuits and said memories for receiving said interrogation signals and having output circuit means for routing said interrogation signal on a selected one of said decoder output circuits as an input trigger signal to said counting means to quickly change said pattern of count signals, whereby the interrogating function of the memory associated with the selected decoder output circuit is skipped.

2. A solid state step switch as set forth in claim 1 including means for selecting which of said decoder output circuits have its carried interrogation signal routed to said counting means.

3. A solid state step switch comprising:

a plurality of memories, each said memory including at least one memory means exhibiting the characteristic of serving to receive and store an electrical signal representative of one of two binary states and upon application thereto of an electrical interrogation signal provides an output signal representative of the binary state of a received said electrical signal, each said memory means having an input for receiving an interrogation signal and an output for carrying a said output signal;

actuator means for, upon each actuation, providing a trigger pulse;

means for counting said trigger pulses and having a plurality of output circuits carrying a pattern of count signals which changes in accordance with the number of counted trigger pulses;

decoder means having a plurality of output circuits, one associated with each said memory and coupled to the input circuit of each said memory means in the associated memory, said decoding means being coupled to said counting means for decoding said pattern of count signals and placing an interrogation signal on a particular one of the decoder output circuits in accordance with the number of counted trigger pulses so that an associated memory is interrogated;

output load control circuit means for coupling the output circuit of each said memory means with an associated load; and said counting means is resettable and has a reset input for receiving a reset signal for resetting said counter to again commence its counting of said trigger pulses; an end skip means interposed between said decoder output circuits and said memories for receiving said interrogation signal and having output means for routing an interrogation signal on a selected one of said decoder output circuits as a reset signal to said reset terminal, whereby said counting means is reset.

4. A solid state step switch as set forth in claim 3, wherein said end skip means includes means for selecting which of said decoder output circuits will have its carried interrogation signal routed to said reset terminal.